United States Patent
McGill et al.

(10) Patent No.: US 11,549,717 B2
(45) Date of Patent: Jan. 10, 2023

(54) ONLINE OPTIMIZATION OF VARIABLE FREQUENCY DRIVE COMPRESSION EFFICIENCY

(71) Applicant: TRANE INTERNATIONAL INC., Davidson, NC (US)

(72) Inventors: Seth M. McGill, Brookings, SD (US); Charles J. Peterson, La Crosse, WI (US); Lauri Juhani Salmia, Espoo (FI); Petri J. Mäki-Ontto, Espoo (FI)

(73) Assignee: TRANE INTERNATIONAL INC., Davidson, NC (US)

( * ) Notice: Subject to any disclaimer, the term of this patent is extended or adjusted under 35 U.S.C. 154(b) by 72 days.

(21) Appl. No.: 17/218,546

(22) Filed: Mar. 31, 2021

(65) Prior Publication Data

US 2022/0316747 A1 Oct. 6, 2022

(51) Int. Cl.
*F24F 11/86* (2018.01)

(52) U.S. Cl.
CPC .................................. *F24F 11/86* (2018.01)

(58) Field of Classification Search
CPC ....... F24F 11/86; F25B 49/02; F25B 2600/02; F25B 2600/025
See application file for complete search history.

(56) References Cited

U.S. PATENT DOCUMENTS

| | | |
|---|---|---|
| 5,534,760 A | 7/1996 | Jung |
| 8,156,757 B2 | 4/2012 | Doty et al. |
| 8,944,777 B2 | 2/2015 | Sakanobe et al. |

(Continued)

FOREIGN PATENT DOCUMENTS

| | | |
|---|---|---|
| JP | 2008109722 A | 5/2008 |
| JP | 5836859 B2 | 11/2015 |

OTHER PUBLICATIONS

Shao et al., "Performance representation of variable-speed compressor for inverter air conditioners based on experimental data", International Journal of Refrigeration, vol. 27, pp. 805-815 (2004), Cited in Extended European Search Report.

(Continued)

*Primary Examiner* — Marc E Norman
(74) *Attorney, Agent, or Firm* — Hamre, Schumann, Mueller & Larson, P.C.

(57) ABSTRACT

A method for adjusting compression efficiency for an HVACR system having a variable-frequency drive (VFD) is disclosed. The method includes determining a first compression efficiency, determining an operating point, determining a region of an operating map when a difference between the operating point and a previously determined operating point exceeds a predetermined threshold, adjusting a VFD input to a first input based on the region of the operating map, and controlling the VFD using the first input for a predetermined period of time. The method also includes determining a second compression efficiency and an operation restriction, adjusting the VFD input to a second input based on the operation restriction and a difference between the first compression efficiency and the second compression efficiency, and controlling the VFD using the second input. The method also includes utilizing machine learning control techniques to control several system variables to optimize the compression efficiency.

20 Claims, 6 Drawing Sheets

(56) References Cited

U.S. PATENT DOCUMENTS

| | | |
|---|---|---|
| 9,590,540 B2 | 3/2017 | Wu et al. |
| 9,850,890 B2 | 12/2017 | Lim et al. |
| 10,113,781 B2 | 10/2018 | Dumas et al. |
| 10,240,839 B2 | 3/2019 | Sykora et al. |
| 2009/0092501 A1* | 4/2009 | Seibel .................... F04B 35/04 700/275 |
| 2010/0236264 A1* | 9/2010 | Lifson .................. F25B 49/005 62/115 |
| 2014/0343733 A1 | 11/2014 | Turner et al. |
| 2018/0356139 A1* | 12/2018 | Johnson ................. F04B 49/20 |

OTHER PUBLICATIONS

Extended European Search Report, European Patent Application No. 22165434.6, dated Dec. 7, 2022 (8 pages).

* cited by examiner

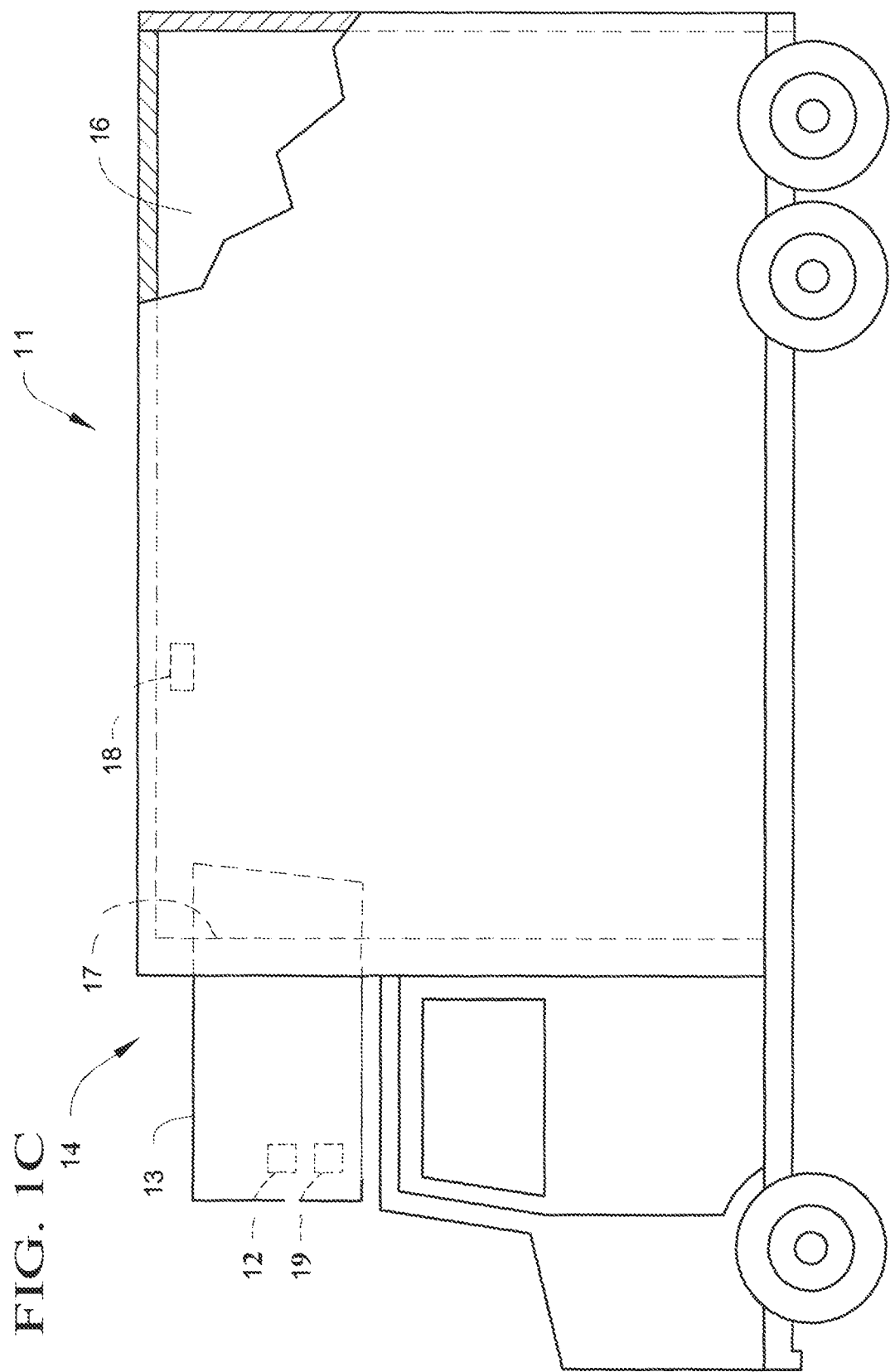

ONLINE OPTIMIZATION OF VARIABLE FREQUENCY DRIVE COMPRESSION EFFICIENCY

FIELD

This disclosure relates generally to optimizing compression efficiency for a heating, ventilation, air conditioning, and refrigeration (HVACR) system. More specifically, the disclosure relates to systems and method for online optimization of compression efficiency for an HVACR system having a variable-frequency drive (VFD).

BACKGROUND

An HVACR system may include a heating, ventilation and air conditioning (HVAC) system and/or a transport climate control system (TCCS) having a transport refrigeration system (TRS). For example, an HVACR system may include a rooftop unit to provide conditioned air to an air distribution system that includes ductwork. In HVACR systems, conditioned air is delivered to a building or occupied space.

SUMMARY

VFD compression efficiency regarding the compressor, the motor, and/or the drive is important to chiller Integrated Part Load Value (IPLV) and Energy Efficiency Ratio (EER) performance. In some applications, dominate compression inefficiencies come from the drive, the motor, the cooling re-compression, and/or the misalignment of the impeller of the compressor due to the elongation of the shaft of the compressor. Efficiency and/or power losses in each of these inter-dependent components (motor, drive, compressor, and/or other components of the HVACR system) may compete against each other, and may change the motor and/or drive system efficiency.

Optimization of drive efficiency, motor efficiency, or some combination of these two is typically achieved via e.g., preprogrammed look-up table(s) based on significant amount of performance modeling and testing. In many VFDs, one approach is to use a low speed versus a high speed pulse width modulation (PWM) pattern switch to e.g., reduce heating in the VFD. Another approach is to use a motor cooling scheme to control the working fluid (e.g., refrigerant, or the like) flow to limit the motor heating to a pre-defined limit. Embodiments disclosed herein provide an on-line modification of key inputs (e.g., inverter PWM switching/carrier frequency, inverter PWM switching/carrier pattern, motor cooling, drive cooling, or the like) to optimize the VFD compression efficiency across an operating map of the HVACR system.

A method for adjusting compression efficiency for an HVACR system having a VFD is disclosed. The method includes determining a first compression efficiency, determining an operating point, determining a region of an operating map when a difference between the operating point and a previously determined operating point exceeds a predetermined threshold, adjusting a VFD input to a first input based on the region of the operating map, and controlling the VFD using the first input for a predetermined period of time. The method also includes determining a second compression efficiency and an operation restriction, adjusting the VFD input to a second input based on the operation restriction and a difference between the first compression efficiency and the second compression efficiency, and controlling the VFD using the second input.

An HVACR system having a VFD is disclosed. The system includes a compressor, a condenser, an expander, and an evaporator fluidly connected. The system also includes a controller. The controller is configured to determine a first compression efficiency, determine an operating point, determine a region of an operating map when a difference between the operating point and a previously determined operating point exceeds a predetermined threshold, adjust a VFD input to a first input based on the region of the operating map, and control the VFD using the first input for a predetermined period of time. The controller is further configured to determine a second compression efficiency and an operation restriction, adjust the VFD input to a second input based on the operation restriction and a difference between the first compression efficiency and the second compression efficiency, and control the VFD using the second input.

Embodiments disclosed herein can also provide a control system to utilize machine learning control techniques. The compression efficiency can be optimized by using machine learning control techniques to determine several system variables.

BRIEF DESCRIPTION OF THE DRAWINGS

References are made to the accompanying drawings that form a part of this disclosure and which illustrate the embodiments in which systems and methods described in this specification can be practiced.

FIG. 1C is a side view of a truck with a transport climate control system, according to an embodiment.

Like reference numbers represent like parts throughout.

DETAILED DESCRIPTION

Figure 1A:
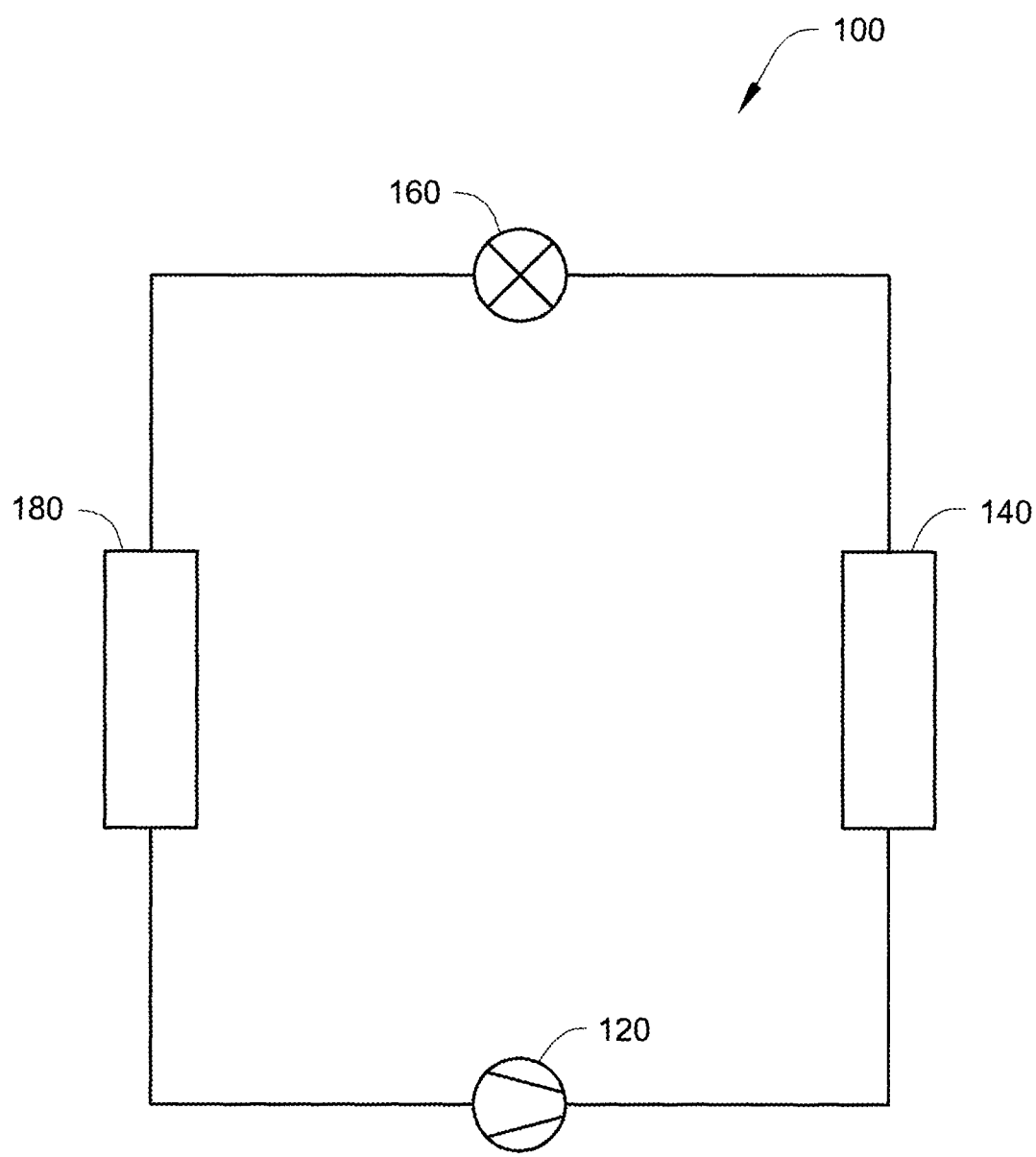
FIG. 1A is a schematic diagram of a refrigeration circuit, which may be implemented in an HVACR system, according to an embodiment.

This disclosure relates generally to optimizing compression system (e.g., variable speed compression system) efficiency for an HVACR system. More specifically, the disclosure relates to systems and method for online optimization of compression system efficiency for an HVACR system having a VFD. An HVACR system may include a chiller (e.g., a water chiller, an air cooled chiller, or any other chillers). In an embodiment, chillers may include motors and various compressor types thereof, electronics cooling, bearings, air handlers, purges, evaporators, condensers, and/or the like.

An online optimization of VFD compression efficiency is disclosed. Adjustments of key inputs of efficiency and/or power loss management (e.g., inverter PWM switching/carrier frequency, inverter PWM switching/carrier pattern, motor cooling, and/or drive cooling, or the like) can be modified live during operation of the HVACR system to achieve the optimal VFD compression system efficiency (e.g., kW/Ton, or the like) while applying the limiting/restriction criteria of inverter thermal limits, motor thermal limits, shaft clearance, or the like independently.

The following definitions are applicable throughout this disclosure. As defined herein, the term "kW/ton" may refer to a ratio of a rate of power input (kW, kilowatts) to a rate of heat removal in tons (1 ton is equal to 12,000 Btu/hour). It will be appreciated that kW/ton may be a measure of efficiency that is equal to the power draw (kW) divided by the cooling consumption (tons). Lower values of kW/ton correspond to an improved efficiency (e.g., compression efficiency or chiller efficiency, or the like). That is, a lower kW/ton means that a unit is more efficient.

The term "compression efficiency", "compression system efficiency", or "chiller efficiency" may refer to efficiency represented by kW/ton (e.g., for large commercial and/or industrial air-conditioning, heat pump, refrigeration systems, and/or other suitable systems), by energy efficiency ratio (EER, e.g., for cooling energy efficiency of e.g., unitary air-conditioning and/or heat pump system, or other suitable systems), by European seasonal energy efficiency ratio (ESEER), or any other suitable energy performance rating.

The term "variable frequency drive" or "VFD" may refer to a type of motor drive to control AC motor speed and torque by varying motor input frequency and voltage. In an embodiment, PWM may be used to vary drives' motor voltage (or current) and frequency. The VFD drive (e.g., an inverter) can drive the motor, and the motor can drive the compressor (e.g., a variable speed compressor).

The term "machine learning" may refer to an application of artificial intelligence (AI) that provides systems the ability to automatically learn and improve from experience without being explicitly programmed. Machine learning focuses on the development of computer programs that can access data and use the data to learn for themselves. Machine learning algorithms build a "trained machine learning model" based on sample data, known as "training data", in order to make predictions or decisions without being explicitly programmed to do so.

Particular embodiments of the present disclosure are described herein with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements that may perform the same, similar, or equivalent functions.

Additionally, the present disclosure may be described herein in terms of functional block components and various processing steps. It should be appreciated that such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential."

FIG. 1A is a schematic diagram of a refrigerant circuit 100, according to an embodiment. The refrigerant circuit 100 generally includes a compressor 120, a condenser 140, an expansion device 160, and an evaporator 180. An "expansion device" as described herein may also be referred to as an expander. In an embodiment, the expander may be an expansion valve, expansion plate, expansion vessel, orifice, or the like, or other such types of expansion mechanisms. It should be appreciated that the expander may be any suitable type of expander used in the field for expanding a working fluid to cause the working fluid to decrease in pressure and temperature. The refrigerant circuit 100 is an example and can be modified to include additional components. For example, in an embodiment, the refrigerant circuit 100 can include other components such as, but not limited to, an economizer heat exchanger, one or more flow control devices, a receiver tank, a dryer, a suction-liquid heat exchanger, fan(s), filter(s), damper(s), or the like.

The refrigerant circuit 100 can generally be applied in a variety of systems used to control an environmental condition (e.g., temperature, humidity, air quality, or the like) in a space (generally referred to as a conditioned space). Examples of such systems include, but are not limited to, HVACR systems including transport refrigeration systems, or the like. In an embodiment, a HVACR system can include a rooftop unit or a heat pump air-conditioning unit.

The compressor 120, condenser 140, expansion device 160, and evaporator 180 are fluidly connected. In an embodiment, the refrigerant circuit 100 can be configured to be a cooling system (e.g., an air conditioning system) capable of operating in a cooling mode. In an embodiment, the refrigerant circuit 100 can be configured to be a heat pump system that can operate in both a cooling mode and a heating/defrost mode. Fan(s) can be provided to a heat exchanger such as the condenser 140 and/or the evaporator 180.

The refrigerant circuit 100 can operate according to generally known principles. The refrigerant circuit 100 can be configured to heat and/or cool a liquid process fluid (e.g., a heat transfer fluid or medium (e.g., a liquid such as, but not limited to, water or the like)), in which case the refrigerant circuit 100 may be generally representative of a liquid chiller system. The refrigerant circuit 100 can alternatively be configured to heat and/or cool a gaseous process fluid (e.g., a heat transfer medium or fluid (e.g., a gas such as, but not limited to, air or the like)), in which case the refrigerant circuit 100 may be generally representative of an air conditioner and/or heat pump.

In operation, the compressor 120 compresses a working fluid (e.g., a heat transfer fluid (e.g., refrigerant or the like)) from a relatively lower pressure gas to a relatively higher-pressure gas. The relatively higher-pressure gas is also at a relatively higher temperature, which is discharged from the compressor 120 and flows through the condenser 140. In accordance with generally known principles, the working fluid flows through the condenser 140 and rejects heat to the process fluid (e.g., water, air, or the like), thereby cooling the working fluid. The cooled working fluid, which is now in a liquid form, flows to the expansion device 160. The expansion device 160 reduces the pressure of the working fluid. As a result, a portion of the working fluid is converted to a gaseous form. The working fluid, which is now in a mixed liquid and gaseous form flows to the evaporator 180. The working fluid flows through the evaporator 180 and absorbs heat from the process fluid (e.g., a heat transfer medium (e.g., water, air, or the like)), heating the working fluid, and converting it to a gaseous form. The gaseous working fluid then returns to the compressor 120. The above-described process continues while the heat transfer circuit is operating, for example, in a cooling mode (e.g., while the compressor 120 is enabled).

Figure 1B:
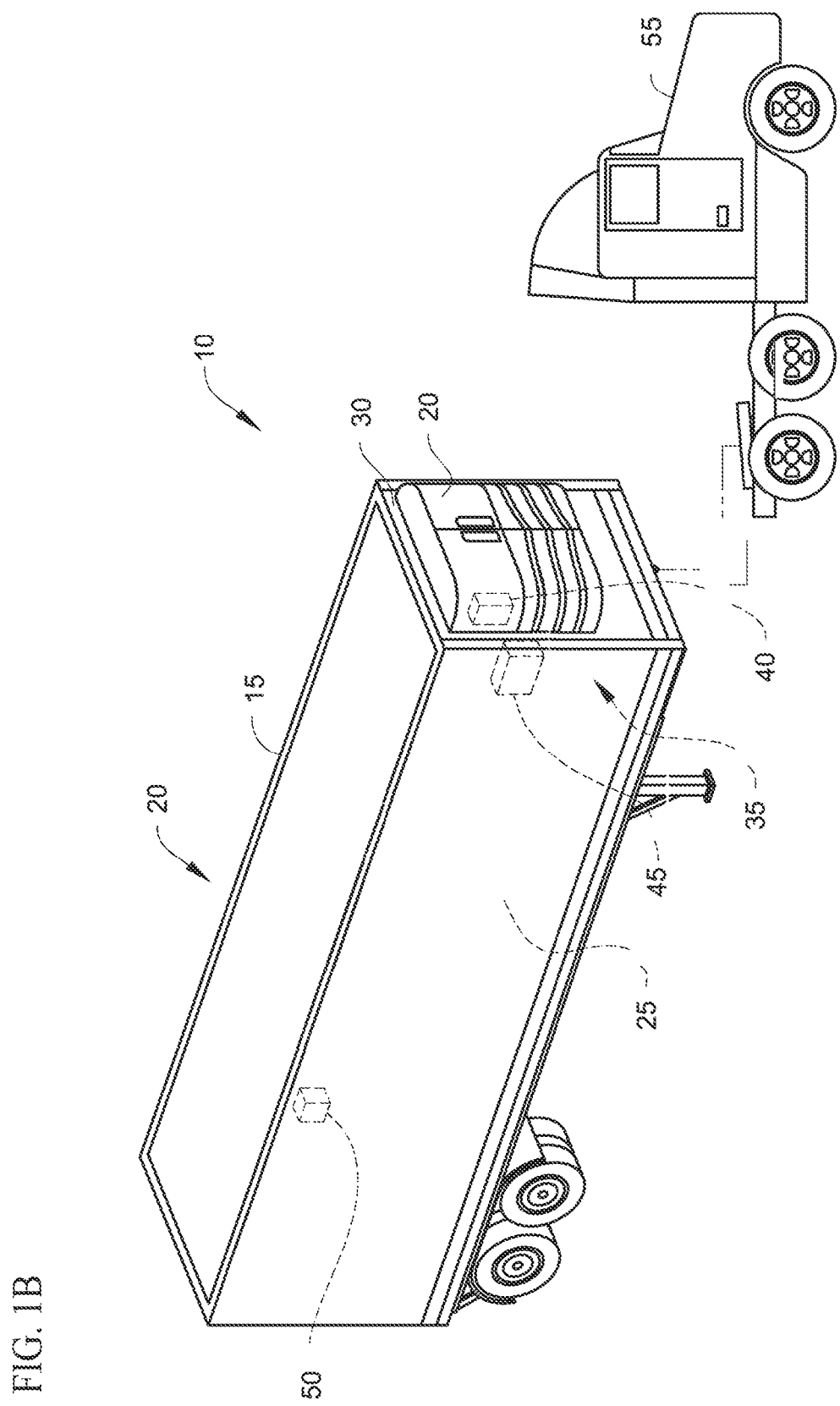
FIG. 1B is a perspective view of a climate controlled transport unit, according to an embodiment.

FIG. 1B is a perspective view of a climate controlled transport unit 20 attachable to a tractor 55, according to an embodiment. The climate controlled transport unit 20 includes a transport climate control system 10 for a transport unit 15. The tractor 55 is attached to and is configured to tow the transport unit 15. The transport unit 15 shown in FIG. 1B is a trailer.

The transport climate control system 10 includes a climate control unit (CCU) 20 that provides environmental control (e.g. temperature, humidity, air quality, or the like) within a climate controlled space 25 of the transport unit 15. The CCU 20 is disposed on a front wall 30 of the transport unit 15. In other embodiments, it will be appreciated that the CCU 20 can be disposed, for example, on a rooftop or another wall of the transport unit 15. The CCU 20 includes a refrigeration circuit (see e.g., FIG. 1A) that connects, for example, a compressor, a condenser, an evaporator, and an expansion device to provide conditioned air within the climate controlled space 25. In an embodiment, the CCU 20 can be a transport refrigeration unit.

The transport climate control system 10 also includes a programmable climate controller 35 and one or more sensors (not shown) that are configured to measure one or more parameters of the transport climate control system 10 (e.g., an ambient temperature outside of the transport unit 15, an ambient humidity outside of the transport unit 15, a compressor suction pressure, a compressor discharge pressure, a supply air temperature of air supplied by the CCU 20 into the climate controlled space 25, a return air temperature of air returned from the climate controlled space 25 back to the CCU 20, a humidity within the climate controlled space 25, or the like) and communicate climate control data to the climate controller 35. The one or more climate control sensors can be positioned at various locations outside the transport unit 20 and/or inside the transport unit 20 (including within the climate controlled space 25).

The climate controller 35 is configured to control operation of the transport climate control system 10 including components of the climate control circuit. The climate controller 35 may include a single integrated control unit 40 or may include a distributed network of climate controller elements 40, 45. The number of distributed control elements in a given network can depend upon the particular application of the principles described herein. The measured parameters obtained by the one or more climate control sensors can be used by the climate controller 35 to control operation of the climate control system 10.

The climate controlled transport unit 20 includes an independent sensor 50. In the illustrated embodiment, the independent sensor 50 is represented as a single sensor. It will be appreciated that in other embodiments, the climate controlled transport unit 20 can include a plurality of independent sensors 50. In some embodiments, the independent sensor 50 is a dedicated regulatory sensor that can provide independent verification of climate control parameters (e.g., temperature, humidity, atmosphere, or the like) within the climate controlled space 25. The independent sensor 50 is not used by the climate controller 35 to control operation of the transport climate control system 10. The independent sensor 50 is in electronic communication with a power source (not shown) of the CCU 20. In an embodiment, the independent sensor 50 is in electronic communication with the climate controller 35. It will be appreciated that the electronic communication between the independent sensor 50 and the climate controller 35 can enable network communication of the sensed verification values or parameters (e.g., temperature data of cargo stored in the climate controlled space 300) measured by the independent sensor 50. The electronic communication between the climate controller 35 and the independent sensor 50 does not enable the sensed verification values or parameters to be utilized in a control of the CCU 20.

FIG. 1C is a side view of a truck 11 with a transport climate control system 14, according to an embodiment. FIG. 1C depicts the climate-controlled truck 11 that includes the climate controlled space 16 for carrying cargo and the transport climate control system 14.

The transport climate control system 14 includes a climate control unit (CCU) 13 that is mounted to a front wall 17 of the climate controlled space 16. The CCU 13 can include, among other components, a refrigeration circuit (see, e.g., FIG. 1A) that connects, for example, a compressor, a condenser, an evaporator, and an expansion device to provide climate control within the climate controlled space 16. In an embodiment, the CCU 13 can be a transport refrigeration unit.

The transport climate control system 14 also includes a programmable climate controller 19 and one or more climate control sensors (not shown) that are configured to measure one or more parameters of the transport climate control system 14 (e.g., an ambient temperature outside of the truck 11, an ambient humidity outside of the truck 11, a compressor suction pressure, a compressor discharge pressure, a supply air temperature of air supplied by the CCU 13 into the climate controlled space 16, a return air temperature of air returned from the climate controlled space 16 back to the CCU 13, a humidity within the climate controlled space 16, or the like) and communicate climate control data to the climate controller 19. The one or more climate control sensors can be positioned at various locations outside the truck 11 and/or inside the truck 11 (including within the climate controlled space 16).

The climate controller 19 is configured to control operation of the transport climate control system 14 including components of the climate control circuit. The climate controller 19 may include a single integrated control unit 19 or may include a distributed network of climate controller elements 19, 12. The number of distributed control elements in a given network can depend upon the particular application of the principles described herein. The measured parameters obtained by the one or more climate control sensors can be used by the climate controller 19 to control operation of the climate control system 14.

The truck 11 includes an independent sensor 18. In the illustrated embodiment, the independent sensor 18 is represented as a single sensor. It will be appreciated that in other embodiments, the truck 11 includes a plurality of independent sensors 18. In some embodiments, the independent sensor 18 is a dedicated regulatory sensor that can provide independent verification of climate control parameters (e.g., temperature, humidity, atmosphere, or the like) within the climate controlled space 16. The independent sensor 18 is not used by the climate controller 19 to control operation of the transport climate control system 14. The independent sensor 18 is in electronic communication with a power source (not shown) of the CCU 13. In an embodiment, the independent sensor 18 is in electronic communication with the climate controller 19. It will be appreciated that the electronic communication between the independent sensor 18 and the climate controller 19 can enable network communication of the sensed verification values or parameters (e.g., temperature data of cargo stored in the climate controlled space 16) measured by the independent sensor 18. The electronic communication between the climate controller 19 and the independent sensor 18 does not enable the sensed verification values or parameters to be utilized in a control of the CCU 13.

Figure 2:
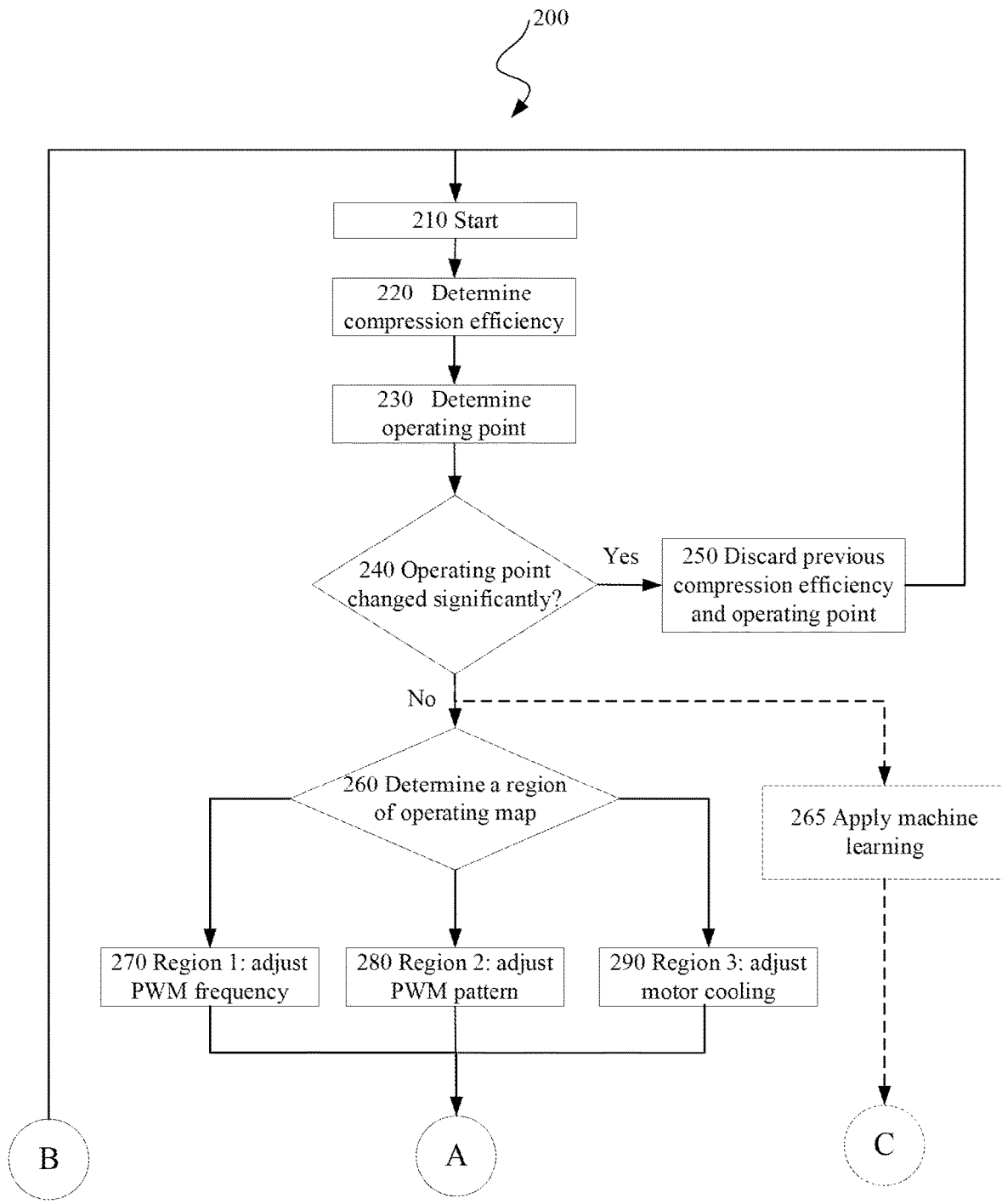
FIG. 2 illustrates a first portion of a flow chart of a method for adjusting compression efficiency for an HVACR system having a VFD, according to an embodiment.

FIG. 2 illustrates a first portion 200 of a flow chart of a method for adjusting or optimizing compression efficiency for an HVACR system having a VFD, according to an embodiment.

Figure 3:
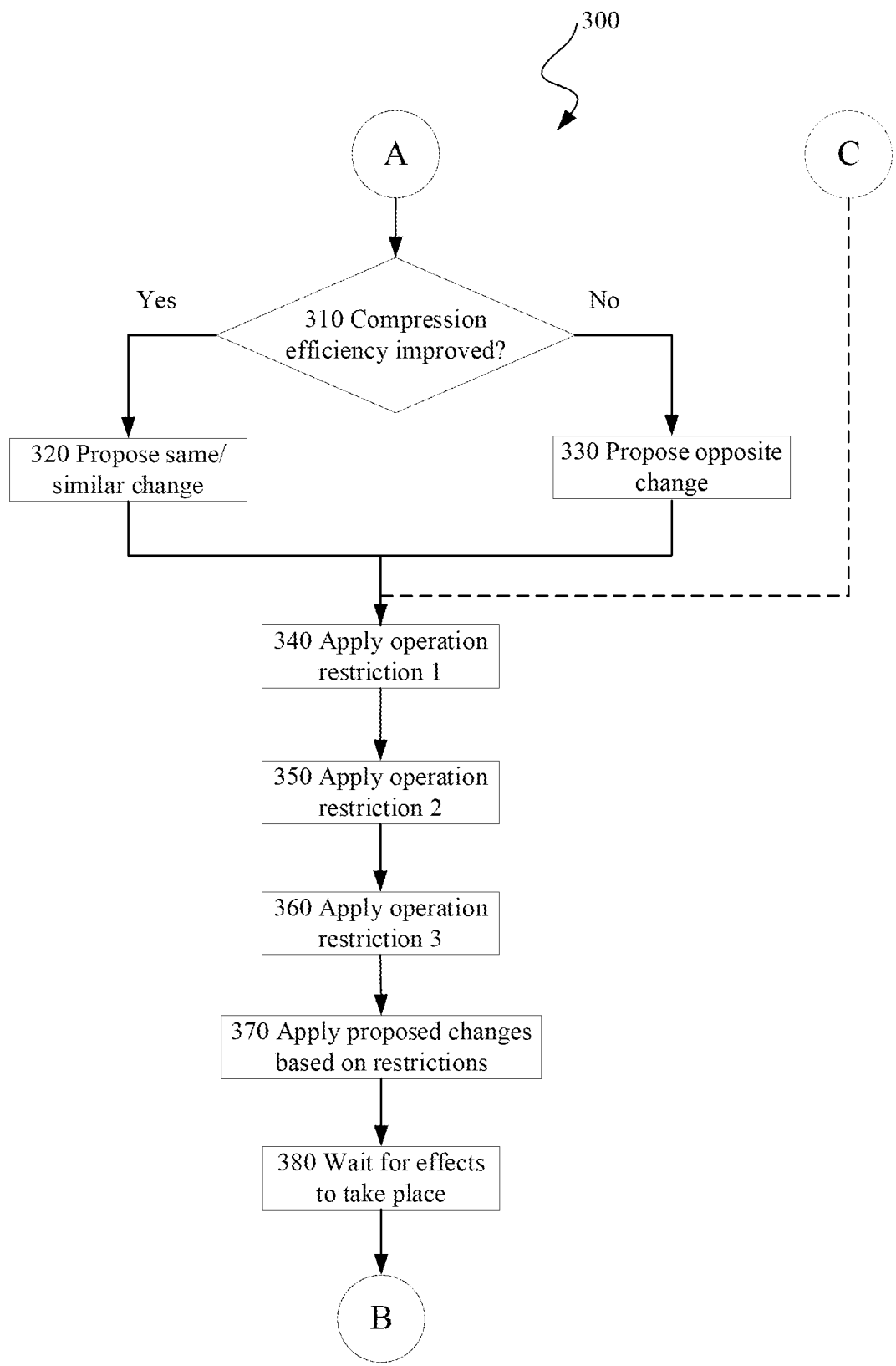
FIG. 3 illustrates a second portion of the flow chart of the method for adjusting compression efficiency for the HVACR system having the VFD, according to an embodiment.

FIG. 3 illustrates a second portion 300 of the flow chart of the method for adjusting or optimizing compression efficiency for the HVACR system having the VFD, according to an embodiment.

The operational or processing flow chart (200, 300) may include one or more operations, actions, or functions depicted by one or more blocks 210, 220, 230, 240 250, 260, 270, 280, 290, 310, 320, 330, 340, 350, 360, 370, and 380. Although illustrated as discrete blocks, various blocks may be divided into additional blocks, combined into fewer blocks, or eliminated, depending on the desired implementation. As a non-limiting example, the blocks of the flow chart (200, 300) may be performed by the controller(s) described herein (e.g., controller 35 of FIG. 1B, controller 19 of FIG. 1C, etc.) or any other suitable controller(s) having e.g., a processor and/or memory. The flow chart (200, 300) may begin at block 210.

Block 210 may refer to a controller starting the method for adjusting or optimizing compression efficiency for the HVACR system having the VFD. In an embodiment, at 210, the components of the HVACR system may start running and/or operating, and the controller may perform initialization steps to initialize the HVACR system. In another embodiment, before 210, the components of the HVACR system may start running and/or operating, the controller may perform initialization steps to initialize the HVACR system, and the controller may start the method for adjusting or optimizing compression efficiency at 210. Block 210 may be followed by block 220.

Block 220 may refer to the controller determining a first compression efficiency. In an embodiment, the compression efficiency may be represented by kW/ton. In another embodiment, the compression efficiency may be represented by EER, SEER, ESEER, or any other energy suitable performance rating or standard.

In an embodiment, the input power (kW) to the HVACR system (e.g., to the drive, the motor, the compressor, other electronics, or the like) can be measured or sensed by, e.g., sensor(s) of the HVACR system such as current sensor(s), voltage sensors, power meter(s) (e.g., installed in the circuit breaker), etc. The measured kW can be communicated to and/or obtained by the controller, and/or stored in a memory or a data logging device.

In an embodiment, the heat-extraction or cooling capacity (ton) of a component (e.g., evaporator, condenser, or the like) of the HVACR system can be determined, by the controller, based on e.g., the process fluid (e.g., water, air, or the like) temperature, the delta T (e.g., a difference between returning process fluid temperature and discharge process fluid temperature, for process fluid out of and/or into the evaporator coil, the condenser coil, or the like), process fluid flow rate, etc. The temperature(s) and/or the flow rate can be measured or sensed by, e.g., sensor(s) of the HVACR system. The measured temperature(s) and/or the flow rate can be communicated to and/or obtained by the controller, and/or stored in a memory or a data logging device.

In an embodiment, the controller can determine the first compression efficiency based on the measured input power (kW) and the determined cooling capacity (ton). Block 220 may be followed by block 230.

Block 230 may refer to the controller determining an operating point. In an embodiment, the operating point may be determined by e.g., the HVACR system demands or requirements such as how many tons of cooling are required, process fluid temperature setpoints, returning process fluid temperature back to the evaporator, discharge process fluid temperature for cooling the condenser, or the like to determine what the compressor may do (e.g., creating more capacity or decreasing capacity, increasing and/or decreasing the compressor and/or motor speed, or the like). As such, the operating point can be determined by one or more operational parameters such as temperature and/or flow rate of the incoming process fluid, ambient temperature of the process fluid, pressure of the refrigerant, compressor speed, discharge and/or suction pressure, process fluid temperature setpoints, etc. In an embodiment, the operating point can be determined by factoring in e.g., trade-offs from switching frequency/pattern, motor speed, motor cooling, or the like. Block 230 may be followed by block 240.

Block 240 may refer to the controller determining whether the operating point is changed significantly (e.g., a difference between the operating point determined at block 230 and a previously determined operating point exceeds a predetermined threshold). For example, when the operating point includes compressor speed, if a difference between the compressor speed determined at block 230 and a previously determined compressor speed exceeds a predetermined threshold (e.g., at or about 10% changes in compressor speed), the compressor speed is considered as being changed significantly. In another example, when the operating point includes a load (e.g., current), if a difference between the load determined at block 230 and a previously determined load exceeds a predetermined threshold (e.g., at or about 10% changes in the load), the load is considered as being changed significantly. It will be appreciated that the predetermined threshold can be defined as a value that changes the operating condition of the HVACR system compared with the system design (e.g., with at or about 2% to at or about 3% system variance when controller(s) performing the regulation) the HVACR system typically runs under such operating condition.

In an embodiment, the previously determined operating point can be an operating point determined by the controller at or before block 210.

When the operating point is changed significantly, block 240 may be followed by block 250. When the operating point is not changed significantly, block 240 may be followed by block 260, and the operating point at block 230 may be stored, by the controller, as the previously determined operating point (e.g., in a memory, a data logging device, or the like) for next iteration of comparison. That is, for a steady state (e.g., the operating point is not changed significantly), embodiments disclosed herein can find and achieve an optimized compression efficiency, by checking whether the compression efficiency is improved in each iteration until no further compression efficiency improvement can be made.

Block 250 may refer to the controller discarding the compression efficiency determined at block 220 and the operating point determined at block 230, and proceeding back to block 210. It will be appreciated that the connector B (see also FIG. 3) loops back to block 210 as well.

In another embodiment, when the operating point is not changed significantly, block 240 may be followed by block 265 (instead of block 260), and the operating point at block 230 may be stored, by the controller, as the previously determined operating point (e.g., in a memory, a data logging device, or the like) for next iteration of comparison. In such embodiment, block 265 (see FIG. 4 for detailed description) may be followed by connector C which connects to block 340 of FIG. 3.

Block 260 may refer to the controller determining an operating map of the HVACR system. In an embodiment, the operating map can include three regions: (Region 1) low speed (e.g., compressor speed, motor speed, or the like) and low lift, (Region 2) medium speed, and (Region 3) high speed and high lift. In an embodiment, a low speed region can be a region of the operating map where a (e.g., compressor speed, motor speed, or the like) ranges from at or about 25% of a maximum speed to at or about 50% of the maximum speed. A medium speed region can be a region of the operating map where the speed ranges from at or about 50% of the maximum speed to at or about 75% of the maximum speed. A high speed region can be a region of the operating map where the speed ranges from at or about 75% of the maximum speed to at or about 100% of the maximum speed. A low lift region can be a region of the operating map where the lift is at or less than 150 pounds per square inch differential (PSID). A high lift region can be a region of the operating map where the lift is at or greater than 150 PSID. In another embodiment, the operating map may include less than or more than three regions.

In an embodiment, the speed (e.g., of the compressor, or the like) can be measured or sensed by, e.g., sensor(s) of the HVACR system. The measured speed can be communicated to and/or obtained by the controller, and/or stored in a memory or a data logging device. The lift can be defined as differential pressure between the evaporator and the condenser (e.g., a difference of the refrigerant pressures between the evaporator and the condenser). The pressure(s) can be measured or sensed by, e.g., sensor(s) of the HVACR system. The measured pressure(s) can be communicated to and/or obtained by the controller, and/or stored in a memory or a data logging device. The lift may indicate how much work the compressor needs to do to lift the pressure from the evaporator pressure up to the condenser pressure. Typically, a lower speed and/or lift may indicate a lower cooling capacity (tons).

When the operating map is at Region 1, block 260 may be followed by block 270. When the operating map is at Region 2, block 260 may be followed by block 280. When the operating map is at Region 3, block 260 may be followed by block 290.

Block 270 may refer to the controller adjusting an inverter PWM switching (or carrier) frequency (e.g., PWM frequency of the VFD drive, which can range from a minimum allowable frequency (e.g., at or about 6 kHz) to a maximum allowable frequency (e.g., at or about 12 kHz)). Adjusting PWM frequency can include increasing or decreasing PWM frequency by a predetermined amount (e.g., amount of at or about 0.5 kHz, or amount of at or about 1 kHz) or percentage. In an embodiment, in the first iteration of the method, PWM frequency can be decreased by the predetermined amount or percentage. In another embodiment, in the first iteration of the method, PWM frequency can be increased by the predetermined amount or percentage. Block 270 may be followed by connector A connecting to block 310 of FIG. 3.

Block 280 may refer to the controller adjusting an inverter PWM switching (or carrier) pattern (e.g., PWM pattern of the VFD drive). Adjusting PWM pattern can include switching the PWM pattern to a first pattern or to a second pattern. In an embodiment, the first pattern can be a discontinuous PWM drive waveform pattern, and the second pattern can be a continuous (e.g., smooth sinusoidal) PWM drive waveform pattern. In an embodiment, in the first iteration of the method, PWM pattern can be switched to the first pattern. In another embodiment, in the first iteration of the method, PWM pattern can be switched to the second pattern. Block 280 may be followed by connector A.

Block 290 may refer to the controller adjusting motor cooling. Adjusting motor cooling can include increasing or decreasing the amount of working fluid (e.g., refrigerant, or the like) to the motor (for cooling the motor) by a predetermined amount or percentage (e.g., ranging from at or about 5% to at or about 10% adjustments). In an embodiment, in the first iteration of the method, motor cooling can be increased (e.g., to serve as a conservative staring point such as over-cooling to avoid over-heating the motor) by the predetermined amount or percentage. In another embodiment, in the first iteration of the method, motor cooling can be decreased by the predetermined amount or percentage. It will be appreciated that the motor cooling requirement may be determined by a load of the motor, and/or the drive switching frequency and/or pattern, etc. More cooling to the motor can mean more compressor or system losses (e.g., power loss and/or efficiency loss, or the like) because the compressor may recompress the working fluid used for cooling the motor, and a recompression cycle can be a system loss. The amount of cooling (e.g., the working fluid from the compression cycle, or any other suitable means to cool the motor) going to the motor needs to be controlled or minimized (e.g., by the controller controlling a control valve such as an expansion valve for the working fluid) to minimize the system losses, and the amount of cooling going to the motor needs to be enough for cooling the motor to avoid overheating the motor. Block 290 may be followed by connector A.

It will be appreciated that there can block(s) which may correspond to other Region(s) of the operating map. Such block(s) may refer to the controller adjusting drive cooling or other system variables, and such block(s) follow block 260 and may be followed by connector A.

In FIG. 3, connector A may be followed by block 310. Block 310 may refer to the controller controlling the VFD using the adjusted inputs from 270, 280, or 290 for a predetermined period of time (e.g., at or about 60 seconds), determining a second compression efficiency (see also block 220), and/or determining whether the compression efficiency is improved by comparing the first compression efficiency and the second compression efficiency. For example, when using kW/ton, if the second kW/ton is less than the first kW/ton, the compression efficiency is improved. In an embodiment, determining whether the compression efficiency is improved includes (1) determining whether the compression efficiency is improved, and (2) determine whether a difference between the first compression efficiency and the second compression efficiency exceeds a predetermined threshold. In such embodiment, if the compression efficiency is improved and the difference exceeds the predetermined threshold, it is considered as the compression efficiency being improved. If the compression efficiency is not improved, or the compression efficiency is improved but the difference does not exceed the predetermined threshold, it is considered as the compression efficiency not being improved.

When the compression efficiency is improved, block 310 may be followed by block 320. When the compression efficiency is not improved, block 310 may be followed by block 330.

Block 320 may refer to the controller proposing same or similar change(s) as the change(s) made last time (e.g., in block 270, 280, or 290, depending on the region of the operating map). For example, if the change(s) made last time is to decrease the PWM frequency by a predetermined amount or percentage (see block 270), the controller can be configured to propose to decrease the PWM frequency by the predetermined amount or percentage again. If the change(s) made last time is to increase the PWM frequency by a predetermined amount or percentage (see block 270), the controller can be configured to propose to increase the PWM frequency by the predetermined amount or percentage again. If the change(s) made last time is to switch the PWM pattern to the first pattern (see block 280), the controller can be configured to propose to keep the first pattern. If the change(s) made last time is to switch the PWM pattern to the second pattern (see block 280), the controller can be configured to propose to keep the second pattern. If the change(s) made last time is to increase the motor cooling by a predetermined amount or percentage (see block 290), the controller can be configured to propose to increase the motor cooling by the predetermined amount or percentage again. If the change(s) made last time is to decrease the motor cooling by a predetermined amount or percentage (see block 290), the controller can be configured to propose to decrease the motor cooling by the predetermined amount or percentage again. Block 320 may be followed by block 340.

Block 330 may refer to the controller proposing opposite change(s) as the change(s) made last time (e.g., in block 270, 280, or 290, depending on the region of the operating map). For example, if the change(s) made last time is to decrease the PWM frequency by a predetermined amount or percentage (see block 270), the controller can be configured to propose to increase the PWM frequency by the predetermined amount or percentage. If the change(s) made last time is to increase the PWM frequency by a predetermined amount or percentage (see block 270), the controller can be configured to propose to decrease the PWM frequency by the predetermined amount or percentage. If the change(s) made last time is to switch the PWM pattern to the first pattern (see block 280), the controller can be configured to propose to switch the PWM pattern to the second pattern. If the change(s) made last time is to switch the PWM pattern to the second pattern (see block 280), the controller can be configured to propose to switch the PWM pattern to the first pattern. If the change(s) made last time is to increase the motor cooling by a predetermined amount or percentage (see block 290), the controller can be configured to propose to decrease the motor cooling by the predetermined amount or percentage again. If the change(s) made last time is to decrease the motor cooling by a predetermined amount or percentage (see block 290), the controller can be configured to propose to increase the motor cooling by the predetermined amount or percentage again. Block 330 may be followed by block 340.

Block 340 may refer to the controller applying or checking a first limit or operation restriction (shaft elongation restriction). The shaft (of the compressor) elongation can be measured or sensed by, e.g., sensor(s) of the HVACR system such as position sensor(s). The measured shaft elongation can be communicated to and/or obtained by the controller, and/or stored in a memory or a data logging device. When the shaft elongation exceeds a predetermined threshold (e.g., a threshold that can prevent mechanical damage(s) to the compression elements), the controller is configured to not allow increased motor heating (e.g., not allow lowering PWM frequency or decreasing motor cooling). It will be appreciated that the impeller can be at a certain location along a length of shaft, and when the shaft grows or shrinks, there can be misalignment of the impeller that effects the working fluid flow coming out of the impeller, which may affect the performance. Block 340 may be followed by block 350.

Block 350 may refer to the controller applying or checking a second limit or operation restriction (motor temperature restriction). The motor temperature can be measured or sensed by, e.g., sensor(s) of the HVACR system such as temperature sensor(s). The measured motor temperature can be communicated to and/or obtained by the controller, and/or stored in a memory or a data logging device. When the motor temperature exceeds a predetermined threshold (e.g., a threshold that does not exceed physical limits of the motor assembly), the controller is configured to not allow increased motor heating (e.g., not allow lowering PWM frequency or decreasing motor cooling). It will be appreciated that motor temperature threshold can be determined based on e.g. an insulation class of the stator winding. Block 350 may be followed by block 360.

Block 360 may refer to the controller applying or checking a third limit or operation restriction (drive temperature restriction). The drive temperature (which may be different from the motor temperature) can be measured or sensed by, e.g., sensor(s) of the HVACR system such as temperature sensor(s). The measured drive temperature can be communicated to and/or obtained by the controller, and/or stored in a memory or a data logging device. When the drive temperature exceeds a predetermined threshold (e.g., a threshold of at or about 150° C. degrees, a junction temperature for Silicon (Si) Insulated Gate Bipolar Transistors (IGBT)), the controller is configured to not allow increased drive heating (e.g., not allow increasing PWM frequency). Block 360 may be followed by block 370.

It will be appreciated that the order of blocks 340, 350, and/or 360 can be changed. For example, the order can be 340→350→360 or 340→360→350 or 350→340→360 or 350→360→340 or 360→340→350 or 360→350→340. It will also be appreciated that in an embodiment, there can be one or more limits/restrictions as described in blocks 340, 350, and/or 360. In another embodiment, there can be other limits/restrictions in addition to those described in blocks 340, 350, and/or 360, depending on the desired implementation.

Block 370 may refer to the controller applying the proposed changes (in block 320 or 330). If there is no restriction applied/enforced from block 340, 350, and/or 360, the controller is configured to apply/make the proposed changes (in block 320 or 330). If there is restriction applied/enforced in block 340, 350, and/or 360, the proposed changes (in block 320 or 330) may be applied based on the restriction(s) applied/enforced in block 340, 350, and/or 360 (e.g., not allowing certain changes). Block 370 may be followed by block 380.

Block 380 may refer to the controller controlling the VFD and/or the HVACR system using the applied changes in block 370 for a predetermined period of time (e.g., at or about 60 seconds) for the effects of the applied changes to take place before the next iteration. Block 380 may be followed by connector B. Connector B may be connected to block 210 of FIG. 2 to start the next iteration of the method of searching for the optimized compression efficiency.

In an embodiment, the method disclosed herein may take a period of time (e.g., at or about 60 seconds) for one iteration because it may take up to the period of time for the changes (e.g., caused by adjusting the VFD inputs, or the like) to temperature, pressure, or the like to be reflected in the HVACR system. That is, for each iteration, how the system operates the period of a time ago (the previous operating point) is compared with how the system operates at a current time (the current operating point), and it may take at least the period of time for the method to find or achieve the optimized compression efficiency.

Embodiments disclosed herein provide a method of on the fly learning the compression efficiency and/or operating point, or the like from the system inputs, of changing the VFD inputs, and of adapting the changes over a period of time (e.g., on the course of a day) in a building or occupied space. For example, the HVACR system may produce more cooling during the day (when chiller operates at a higher load) than in the morning or evening (when chiller operates at a lower load), which means that the HVACR may change from a steady state (low/medium/high cooling) to another state (e.g., morning to day, day to evening, or the like). As soon as the state changes (e.g., from at or about 400 tons of cooling capacity in the morning to at or about 600 tons of cooling capacity in the day, the chiller may ramp up to such capacity in at or about 30 min to at or about one hour), the method disclosed herein may begin. At the end of the day, the change may reverse (e.g., e.g., from at or about 600 tons of cooling capacity in the day to at or about 400 tons of cooling capacity in the evening), and the method disclosed herein may begin as soon as the state changes. That is, for a steady state (e.g., the operating point is not changed significantly, e.g., in the morning, during the day, or in the evening, or the like), embodiments disclosed herein can find and achieve an optimized compression efficiency.

The method disclosed herein can learn from the rules or inputs to optimize the compression efficiency, and can change the settings or VFD inputs as the system runs on the operating map to determine a further improved compression efficiency, if the compression efficiency is not optimized yet in previous iteration(s).

Figure 4:
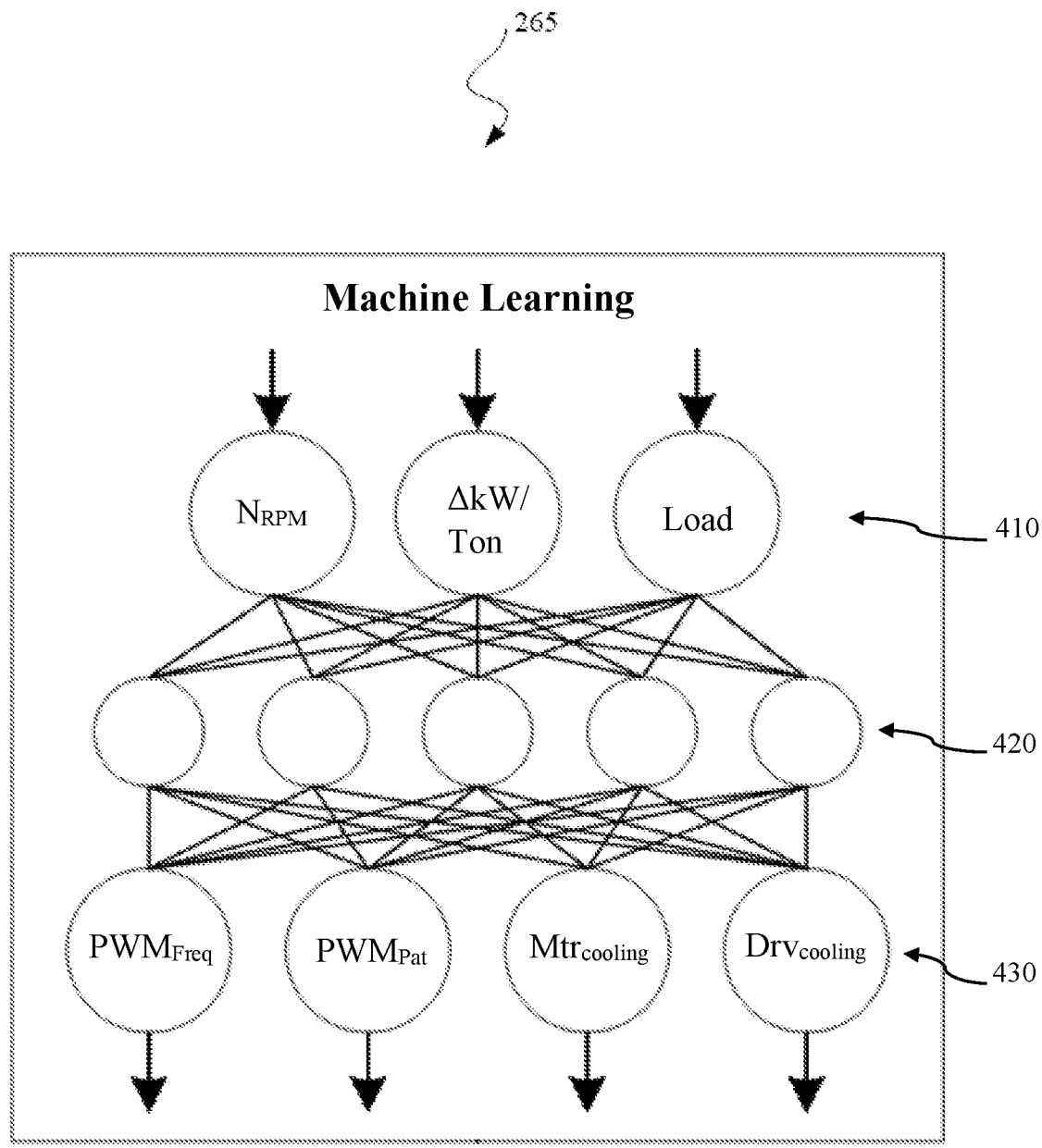
FIG. 4 illustrates a schematic view of a method for a machine learning system for adjusting or optimizing compression efficiency for the HVACR system having the VFD, according to an embodiment.

FIG. 4 illustrates a schematic view of a method 265 of FIG. 2 for a machine learning system for adjusting or optimizing compression efficiency for the HVACR system having the VFD, according to an embodiment. It will be appreciated that the method 265 may be in addition to or may replace blocks 260, 270, 280, 290 of FIG. 2 and blocks 310, 320, and 330 of FIG. 3 to serve as an alternative embodiment.

That is, in FIG. 2, when the operating point is not changed significantly, block 240 may be followed by block 265 (instead of block 260), and block 265 may be followed by connector C which connects to block 340 of FIG. 3.

The method 265 may include one or more operations, actions, or functions 420. As a non-limiting example, the method 265 may be performed by the controller(s) described herein (e.g., controller 35 of FIG. 1B, controller 19 of FIG. 1C, etc.) or any other suitable controller(s) having e.g., a processor and/or memory. The method 265 can deploy e.g., a trained machine learning model (e.g., a compression efficiency model) to determine system variables (e.g., inverter PWM switching/carrier frequency, inverter PWM switching/carrier pattern, motor cooling, drive cooling, or the like).

As shown in FIG. 4, the method 265 includes inputs 410 such as motor speed (e.g., the number of revolutions per minute (NpRm)), the load, the change(s) in kW/Ton (AkW/Ton), and/or the like to the trained compression efficiency model. The running of the trained compression efficiency model (e.g., by the controller) can provide outputs 430 such as the setpoints or determination of the system variables (e.g., inverter PWM switching/carrier frequency, inverter PWM switching/carrier pattern, motor cooling, drive cooling, and/or the like) to be applied at block 370 of FIG. 3 after the limits/restrictions (e.g., blocks 340, 350, and/or 360) are applied.

It will be appreciated that the method 265 can include steps 420 such as the controller creating the machine learning model (e.g., the compression efficiency model). The compression efficiency model can be saved in e.g., a memory or any other suitable devices.

It will be appreciated that the method 265 can also include steps 420 such as the controller training the compression efficiency model using data from the HVACR system. The data can include any one or more of, but is not limited to, the input power (kW), the heat-extraction or cooling capacity (ton), the process fluid temperature, the delta T, and/or the process fluid flow rate from block 220. The data can also include the operating point, the HVACR system demands or requirements, the process fluid temperature setpoints, the returning process fluid temperature back to the evaporator, the discharge process fluid temperature for cooling the condenser, the compressor capacity, the compressor and/or motor speed, temperature and/or flow rate of the incoming process fluid, the ambient temperature of the process fluid, the pressure of the refrigerant, and/or the discharge and/or suction pressure from block 230. The data can further include the speed and/or the lift from block 260, the PWM frequency from block 270, the PWM pattern from block 280, and/or the amount of motor cooling from block 290. It will be appreciated that the data and/or process to achieve the optimized compression efficiency as described in FIGS. 2 and 3 can be used to facilitate the training.

It will be appreciated that the method 265 can further include steps 420 such as the controller deploying the trained compression efficiency model for use. For example, the trained compression efficiency model can be deployed to a controller of the HVACR system in the field for use.

It will be appreciated that the type and/or source of the data (i.e., field data from the HVACR system when the HVACR system is operating) for running the trained compression efficiency model can be similar to the type and/or source of the data (i.e., data based on experience, testing, or the like) for training the compression efficiency model.

It will be appreciated that the method 265 can also include steps 420 such as the controller retraining the compression efficiency model using updated or new training data.

It will be appreciated that there can be other different VFD controls. For example, a higher predetermined PWM switching frequency may be used at part load, and a lower predetermined PWM switching frequency may be used at full load (to e.g., save on drive losses). Look-up table(s) can also be used.

Embodiments disclosed herein can provide performance benefits, e.g., VFD compression efficiency improvement, especially at part load conditions which are difficult to model and predict. Embodiments disclosed herein can provide development benefits, e.g., reducing the amount of system modeling and testing in development stage to identify peak system performance, and reducing errors in the modeling. Since the compression efficiency (e.g., kW/ton, or the like) is measured live while running the HVACR system, the method disclosed herein can naturally react to effects of efficiency from aging (e.g., of the motor, drive, compressor, or the like which may become less powerful over the years due to aging, may overheat a few times, and may become less efficiency than it younger self) of the components (e.g., drive, motor, compressor, or the like) of the HVACR system, piece-to-piece variance (e.g., more/less vanish on the winding, harder/easier to cool, or the like) of a particular component built during manufacturing, variant components in the HVARC system (motor, drive, compressor, or the like), untested portions of the operating map, etc.

Embodiments disclosed herein may provide dynamic performance improvement especially for part load compared with static settings (e.g., a static setting using e.g., 8 KHz PWM frequency, discontinuous switching pattern from the drive into the motor, motor making a certain amount of heat requiring a certain amount of cooling, or the like).

Embodiments disclosed herein may apply to VFD driven motor where there are several competing tradeoffs between the interdependent motor and/or drive losses and the mechanical efficiency of the driven shaft. It will be appreciated that there can be trade-offs between e.g., the motor and the drive (e.g., drive efficiency versus motor cooling). For example, if the motor gets a smooth sinusoidal (continuous) waveform pattern and a high switching frequency from the drive, the motor may operate more efficiently. However, the drive may need to do a lot of work to produce high switching frequency and/or continuous waveform, which means that the drive may be less efficient. When the motor is less efficient (while the drive is more efficient), the motor may be hotter and require more cooling (which means more losses and/or less efficient regarding compression efficiency). When the motor is more efficient (while the drive is less efficient), the motor may be cooler and require less cooling (which means higher compression efficiency). That is, there can be many interrelated or interdependent parts or components of the HVACR system that may compete against each other so that one component may be more efficient but the other component may be less efficient. It can be difficult to model a most efficient way to run the HVACR system. Embodiments disclosed herein can use the measurement(s) indicating whether the compression efficiency of the HVACR system is going toward a right direction and can change the settings or inputs online to achieve the optimized compression efficiency.

It will also be appreciated that there can be linkage between PWM frequency and motor losses and/or drive losses in permanent magnet (PM) motor(s), and there are trade-offs between reducing motor heating and the compression efficiency hit due to the cooling of the motor. Testing is performed and data have proved such causalities. Comprehensive data showing compression efficiency (e.g., kW/ton, or the like) versus PWM frequency/pattern and motor cooling can be obtained e.g., at different load lines, pressure ratios, etc. Embodiments disclosed herein can continually modify PWM frequency/pattern and motor cooling to optimize the compression efficiency (e.g., kW/ton, etc.).

Aspects:

It is appreciated that any one of aspects 1-9, can be combined with any one of aspects 10-20, and any one of aspects 10-19 can be combined with aspect 2020 can be combined with each other.

Aspect 1. A method for adjusting compression efficiency for a heating, ventilation, air conditioning, and refrigeration (HVACR) system having a variable-frequency drive (VFD), the method comprising:
 determining, by a controller, a first compression efficiency;
 determining, by the controller, an operating point;
 determining a region of an operating map when a difference between the operating point and a previously determined operating point exceeds a predetermined threshold;
 adjusting a VFD input to a first input based on the region of the operating map;
 controlling the VFD using the first input for a predetermined period of time;
 determining a second compression efficiency and an operation restriction;
 adjusting the VFD input to a second input based on the operation restriction and a difference between the first compression efficiency and the second compression efficiency; and
 controlling the VFD using the second input.

Aspect 2. The method according to aspect 1, wherein determining the first compression efficiency includes determining a first kW/Ton,
 determining the second compression efficiency includes determining a second kW/Ton.

Aspect 3. The method according to aspect 1, wherein determining the first compression efficiency includes determining a first energy performance rating,
 determining the second compression efficiency includes determining a second energy performance rating.

Aspect 4. The method according to any one of aspects 1-3, wherein determining the operating point includes determining one or more of a compressor speed, a discharge pressure, a suction pressure, a process fluid temperature setpoint, a process fluid flow rate, and an ambient temperature.

Aspect 5. The method according to any one of aspects 1-4, further comprising:
 storing the operating point as the previously determined operating point.

Aspect 6. The method according to any one of aspects 1-5, wherein when the region of the operating map is a first region, adjusting the VFD input to the first input includes adjusting a pulse width modulation (PWM) frequency of the VFD.

Aspect 7. The method according to any one of aspects 1-5, wherein when the region of the operating map is a second region, adjusting the VFD input to the first input includes adjusting a pulse width modulation (PWM) pattern of the VFD.

Aspect 8. The method according to any one of aspects 1-5, wherein when the region of the operating map is a third region, adjusting the VFD input to the first input includes adjusting a motor cooling.

Aspect 9. The method according to any one of aspects 1-8, wherein the operation restriction is one or more of a shaft elongation restriction, a motor temperature restriction, and a drive temperature restriction.

Aspect 10. A heating, ventilation, air conditioning, and refrigeration (HVACR) system having a variable-frequency drive (VFD), the system comprising:

a compressor, a condenser, an expander, and an evaporator fluidly connected; and a controller,
wherein the controller is configured to:
determine a first compression efficiency;
determine an operating point;
determine a region of an operating map when a difference between the operating point and a previously determined operating point exceeds a predetermined threshold;
adjust a VFD input to a first input based on the region of the operating map;
control the VFD using the first input for a predetermined period of time;
determine a second compression efficiency and an operation restriction;
adjust the VFD input to a second input based on the operation restriction and a difference between the first compression efficiency and the second compression efficiency; and
control the VFD using the second input.

Aspect 11. The HVACR system according to aspect 10, wherein the controller is further configured to determine a first kW/Ton as the first compression efficiency and determine a second kW/Ton as the second compression efficiency.

Aspect 12. The HVACR system according to aspect 10, wherein the controller is further configured to determine a first energy performance rating as the first compression efficiency and determine a second energy performance rating as the second compression efficiency.

Aspect 13. The HVACR system according to any one of aspects 10-12, wherein the controller is further configured to determine one or more of a compressor speed, a discharge pressure, a suction pressure, a process fluid temperature setpoint, a process fluid flow rate, and an ambient temperature as the operating point.

Aspect 14. The HVACR system according to any one of aspects 10-13, wherein the controller is further configured to store the operating point as the previously determined operating point.

Aspect 15. The HVACR system according to any one of aspects 10-14, wherein when the region of the operating map is a first region, the controller is further configured to adjust a pulse width modulation (PWM) frequency of the VFD.

Aspect 16. The HVACR system according to any one of aspects 10-14, wherein when the region of the operating map is a second region, the controller is further configured to adjust a pulse width modulation (PWM) pattern of the VFD.

Aspect 17. The HVACR system according to any one of aspects 10-14, wherein when the region of the operating map is a third region, the controller is further configured to adjust a motor cooling.

Aspect 18. The HVACR system according to any one of aspects 10-17, wherein the operation restriction is one or more of a shaft elongation restriction, a motor temperature restriction, and a drive temperature restriction.

Aspect 19. The HVACR system according to any one of aspects 10-18, wherein the compressor is driven by a VFD driven motor.

Aspect 20. A method for adjusting compression efficiency for a heating, ventilation, air conditioning, and refrigeration (HVACR) system having a variable-frequency drive (VFD), the method comprising:
determining, by a controller, a compression efficiency;
determining, by the controller, an operating point;
applying a machine learning control to adjust a VFD input when a difference between the operating point and a previously determined operating point exceeds a predetermined threshold;
determining an operation restriction;
applying the VFD input based on the operation restriction; and
controlling the VFD using the VFD input.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for adjusting compression efficiency for a heating, ventilation, air conditioning, and refrigeration (HVACR) system having a variable-frequency drive (VFD), the method comprising:
    determining, by a controller, a first compression efficiency;
    determining, by the controller, an operating point;
    determining a region of an operating map when a difference between the operating point and a previously determined operating point exceeds a predetermined threshold;
    adjusting a VFD input to a first input based on the region of the operating map;
    controlling the VFD using the first input for a predetermined period of time;
    determining a second compression efficiency and an operation restriction;
    adjusting the VFD input to a second input based on the operation restriction and a difference between the first compression efficiency and the second compression efficiency; and
    controlling the VFD using the second input.

2. The method according to claim 1, wherein determining the first compression efficiency includes determining a first kW/Ton,
    determining the second compression efficiency includes determining a second kW/Ton.

3. The method according to claim 1, wherein determining the first compression efficiency includes determining a first energy performance rating,
    determining the second compression efficiency includes determining a second energy performance rating.

4. The method according to claim 1, wherein determining the operating point includes determining one or more of a compressor speed, a discharge pressure, a suction pressure, a process fluid temperature setpoint, a process fluid flow rate, and an ambient temperature.

5. The method according to claim 1, further comprising:
    storing the operating point as the previously determined operating point.

6. The method according to claim 1, wherein when the region of the operating map is a first region, adjusting the VFD input to the first input includes adjusting a pulse width modulation (PWM) frequency of the VFD.

7. The method according to claim 1, wherein when the region of the operating map is a second region, adjusting the VFD input to the first input includes adjusting a pulse width modulation (PWM) pattern of the VFD.

8. The method according to claim 1, wherein when the region of the operating map is a third region, adjusting the VFD input to the first input includes adjusting a motor cooling.

9. The method according to claim 1, wherein the operation restriction is one or more of a shaft elongation restriction, a motor temperature restriction, and a drive temperature restriction.

10. A heating, ventilation, air conditioning, and refrigeration (HVACR) system having a variable-frequency drive (VFD), the system comprising:
a compressor, a condenser, an expander, and an evaporator fluidly connected; and
a controller,
wherein the controller is configured to:
determine a first compression efficiency;
determine an operating point;
determine a region of an operating map when a difference between the operating point and a previously determined operating point exceeds a predetermined threshold;
adjust a VFD input to a first input based on the region of the operating map;
control the VFD using the first input for a predetermined period of time;
determine a second compression efficiency and an operation restriction;
adjust the VFD input to a second input based on the operation restriction and a difference between the first compression efficiency and the second compression efficiency; and
control the VFD using the second input.

11. The HVACR system according to claim 10, wherein the controller is further configured to determine a first kW/Ton as the first compression efficiency and determine a second kW/Ton as the second compression efficiency.

12. The HVACR system according to claim 10, wherein the controller is further configured to determine a first energy performance rating as the first compression efficiency and determine a second energy performance rating as the second compression efficiency.

13. The HVACR system according to claim 10, wherein the controller is further configured to determine one or more of a compressor speed, a discharge pressure, a suction pressure, a process fluid temperature setpoint, a process fluid flow rate, and an ambient temperature as the operating point.

14. The HVACR system according to claim 10, wherein the controller is further configured to store the operating point as the previously determined operating point.

15. The HVACR system according to claim 10, wherein when the region of the operating map is a first region, the controller is further configured to adjust a pulse width modulation (PWM) frequency of the VFD.

16. The HVACR system according to claim 10, wherein when the region of the operating map is a second region, the controller is further configured to adjust a pulse width modulation (PWM) pattern of the VFD.

17. The HVACR system according to claim 10, wherein when the region of the operating map is a third region, the controller is further configured to adjust a motor cooling.

18. The HVACR system according to claim 10, wherein the operation restriction is one or more of a shaft elongation restriction, a motor temperature restriction, and a drive temperature restriction.

19. The HVACR system according to claim 10, wherein the compressor is a variable speed compressor driven by a VFD driven motor.

20. A method for adjusting compression efficiency for a heating, ventilation, air conditioning, and refrigeration (HVACR) system having a variable-frequency drive (VFD), the method comprising:
determining, by a controller, a compression efficiency;
determining, by the controller, an operating point;
applying a machine learning control to adjust a VFD input when a difference between the operating point and a previously determined operating point exceeds a predetermined threshold;
determining an operation restriction;
applying the VFD input based on the operation restriction; and
controlling the VFD using the VFD input.

* * * * *